US010546290B2

(12) United States Patent
Khan et al.

(10) Patent No.: US 10,546,290 B2
(45) Date of Patent: *Jan. 28, 2020

(54) METHODS, SYSTEMS, AND COMPUTER READABLE MEDIA FOR PROVISIONING AND UTILIZING AN AGGREGATED SOFT CARD ON A MOBILE DEVICE

(71) Applicant: MasterCard International Incorporated, Purchase, NY (US)

(72) Inventors: Mohammad Khan, San Jose, CA (US); Pradeep Kumar, Fremont, CA (US); Dickey B. Singh, San Carlos, CA (US); Philippe Martin, San Jose, CA (US)

(73) Assignee: Mastercard International Incorporated, Purchase, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 15/688,270

(22) Filed: Aug. 28, 2017

(65) Prior Publication Data

US 2017/0357963 A1  Dec. 14, 2017

Related U.S. Application Data

(63) Continuation of application No. 13/669,346, filed on Nov. 5, 2012, now Pat. No. 9,767,452.
(Continued)

(51) Int. Cl.
*G06Q 20/36* (2012.01)
*G06Q 20/02* (2012.01)
(Continued)

(52) U.S. Cl.
CPC ............ *G06Q 20/36* (2013.01); *G06Q 20/02* (2013.01); *G06Q 20/20* (2013.01); *G06Q 20/32* (2013.01);
(Continued)

(58) Field of Classification Search
None
See application file for complete search history.

(56) References Cited

U.S. PATENT DOCUMENTS 5,578,808 A  11/1996  Taylor
5,590,038 A  12/1996  Pitroda
(Continued)

FOREIGN PATENT DOCUMENTS

AP  3452  10/2015
AU  2009282041  10/2015
(Continued)

OTHER PUBLICATIONS

Advisory Action and AFCP 2.0 Decision for U.S. Appl. No. 13/453,707 (dated May 31, 2018).
(Continued)

*Primary Examiner* — Allen C Chein
(74) *Attorney, Agent, or Firm* — Jenkins, Wilson, Taylor, & Hunt P.A.

(57) ABSTRACT

Methods, systems, and computer readable media for utilizing and provisioning an aggregated soft card are disclosed. One method includes receiving a request for an aggregated soft card from a mobile device, wherein the aggregated soft card includes a primary component soft card and at least one secondary component soft card. The method also includes requesting component soft card data associated with each of the primary component soft card and the at least one secondary component soft card from a plurality of issuing system servers. The method further includes generating aggregated soft card data by establishing a link among the component soft card data received from the plurality of issuing system servers and sending the aggregated soft card data to the mobile device.

20 Claims, 2 Drawing Sheets

Related U.S. Application Data

(60) Provisional application No. 61/555,279, filed on Nov. 3, 2011.

(51) Int. Cl.
  *G06Q 20/20* (2012.01)
  *G06Q 20/32* (2012.01)
  *G06Q 20/34* (2012.01)

(52) U.S. Cl.
  CPC ....... *G06Q 20/322* (2013.01); *G06Q 20/3227* (2013.01); *G06Q 20/3278* (2013.01); *G06Q 20/351* (2013.01)

(56) References Cited

U.S. PATENT DOCUMENTS

| | | |
|---|---|---|
| 5,884,271 A | 3/1999 | Pitroda |
| 6,078,820 A | 6/2000 | Wells et al. |
| 6,592,044 B1 | 7/2003 | Wong et al. |
| 6,793,135 B1 | 9/2004 | Ryoo |
| 6,999,943 B1 | 2/2006 | Johnson et al. |
| 7,031,693 B2 | 4/2006 | Öhrström et al. |
| 7,103,572 B1 | 9/2006 | Kawaguchi et al. |
| 7,127,236 B2 | 10/2006 | Khan et al. |
| 7,209,733 B2 | 4/2007 | Ortiz et al. |
| 7,308,254 B1 | 12/2007 | Rissanen |
| 7,318,049 B2 | 1/2008 | Iannacci |
| 7,469,151 B2 | 12/2008 | Khan et al. |
| 7,631,803 B2 | 12/2009 | Peyret et al. |
| 7,783,532 B2 | 8/2010 | Hsu et al. |
| 7,942,337 B2 | 5/2011 | Jain |
| 7,954,717 B2 | 6/2011 | Narendra et al. |
| 8,165,635 B2 | 4/2012 | Khan et al. |
| 8,175,973 B2 | 5/2012 | Davis et al. |
| 8,620,299 B2 | 12/2013 | Kumar |
| 8,751,317 B2 | 6/2014 | Qawami et al. |
| 9,767,452 B2 | 9/2017 | Khan et al. |
| 2001/0032182 A1 | 10/2001 | Kumar et al. |
| 2002/0026367 A1 | 2/2002 | Villaret et al. |
| 2002/0091569 A1 | 7/2002 | Kitaura et al. |
| 2002/0138347 A1 | 9/2002 | Sakata |
| 2002/0161640 A1 | 10/2002 | Wolfe |
| 2003/0101246 A1 | 5/2003 | Lahti |
| 2003/0199265 A1 | 10/2003 | Aoyama et al. |
| 2003/0236712 A1 | 12/2003 | Antonucci et al. |
| 2004/0029569 A1 | 2/2004 | Khan et al. |
| 2004/0131185 A1 | 7/2004 | Kakumer |
| 2004/0181463 A1 | 9/2004 | Goldthwaite et al. |
| 2005/0041793 A1 | 2/2005 | Fulton et al. |
| 2005/0070257 A1 | 3/2005 | Saarinen et al. |
| 2006/0023856 A1 | 2/2006 | Welton |
| 2006/0080111 A1 | 4/2006 | Homeier-Beals |
| 2006/0163343 A1 | 7/2006 | Changryeol |
| 2006/0165060 A1 | 7/2006 | Dua |
| 2006/0180664 A1 | 8/2006 | Barrett et al. |
| 2006/0236325 A1 | 10/2006 | Rao et al. |
| 2006/0282319 A1 | 12/2006 | Maggio |
| 2007/0016479 A1 | 1/2007 | Lauper |
| 2007/0042756 A1 | 2/2007 | Perfetto et al. |
| 2007/0050871 A1 | 3/2007 | Mashhour |
| 2007/0087765 A1 | 4/2007 | Richardson et al. |
| 2007/0099599 A1 | 5/2007 | Smith et al. |
| 2007/0152829 A1 | 7/2007 | Lindsay et al. |
| 2007/0174116 A1 | 7/2007 | Keith et al. |
| 2007/0241183 A1 | 10/2007 | Brown et al. |
| 2007/0241189 A1 | 10/2007 | Slavin et al. |
| 2007/0278290 A1 | 12/2007 | Messerges et al. |
| 2008/0000965 A1 | 1/2008 | Zellner et al. |
| 2008/0040354 A1 | 2/2008 | Ray et al. |
| 2008/0051059 A1 | 2/2008 | Fisher |
| 2008/0052164 A1 | 2/2008 | Abifaker |
| 2008/0058014 A1* | 3/2008 | Khan ................... G06Q 20/32 455/558 |
| 2008/0126145 A1 | 5/2008 | Rackley, III et al. |
| 2008/0195473 A1 | 8/2008 | Laramy et al. |
| 2008/0238610 A1 | 10/2008 | Rosenberg |
| 2008/0255942 A1 | 10/2008 | Craft |
| 2008/0257958 A1 | 10/2008 | Rothwell et al. |
| 2008/0262928 A1 | 10/2008 | Michaelis |
| 2009/0164322 A1 | 6/2009 | Khan et al. |
| 2009/0265228 A1 | 10/2009 | Sterling et al. |
| 2010/0041368 A1 | 2/2010 | Kumar |
| 2010/0063906 A1 | 3/2010 | Nelsen et al. |
| 2010/0174598 A1 | 7/2010 | Khan et al. |
| 2010/0213253 A1 | 8/2010 | Wollbrand et al. |
| 2010/0241494 A1 | 9/2010 | Kumar et al. |
| 2011/0131107 A1 | 6/2011 | Hurst |
| 2011/0251892 A1 | 10/2011 | Laracey |
| 2011/0296182 A1 | 12/2011 | Jia et al. |
| 2012/0254030 A1 | 10/2012 | Khan et al. |
| 2012/0265625 A1 | 10/2012 | Pletz et al. |
| 2012/0265685 A1 | 10/2012 | Brudnicki et al. |
| 2013/0124349 A1 | 5/2013 | Khan et al. |
| 2017/0352051 A1 | 12/2017 | Watkins et al. |

FOREIGN PATENT DOCUMENTS

| | | |
|---|---|---|
| CA | 2 546 911 | 11/2007 |
| CA | 2 546 911 A1 | 11/2007 |
| CN | 1274897 A | 11/2000 |
| CN | 1585964 A | 2/2005 |
| CN | 200780040617.4 | 11/2012 |
| CN | 102845040 B | 5/2016 |
| EP | 1 528 827 A2 | 5/2005 |
| EP | 2 062 219 B1 | 7/2015 |
| EP | 2 937 829 A1 | 10/2015 |
| JP | 2003271815 | 9/2003 |
| JP | 2006040249 | 2/2006 |
| KR | 10-2000-0054540 | 9/2000 |
| KR | 10-2001-0069935 | 7/2001 |
| KR | 10-2001-0097065 | 11/2001 |
| KR | 10-2002-0004566 | 1/2002 |
| KR | 10-2003-0000447 | 1/2003 |
| KR | 10-2003-0013973 | 2/2003 |
| KR | 2003-0068226 | 8/2003 |
| KR | 10-2004-0032289 | 4/2004 |
| KR | 10-2007-0030351 | 3/2007 |
| KR | 10-2010-0034314 A | 4/2010 |
| KR | 10-2011-0001042 A | 1/2011 |
| MX | 319439 | 4/2014 |
| SG | 168926 | 9/2013 |
| WO | WO 03/024139 A2 | 3/2003 |
| WO | WO 03/046742 A1 | 6/2003 |
| WO | WO 2004/021240 A1 | 3/2004 |
| WO | WO 2005/086593 A2 | 9/2005 |
| WO | WO 2005/098769 A1 | 10/2005 |
| WO | WO 2005/111882 A1 | 11/2005 |
| WO | WO 2008/030307 A2 | 3/2008 |
| WO | WO 2008/042302 A2 | 4/2008 |
| WO | WO 2010/019670 A2 | 2/2010 |
| WO | WO 2010/071859 A2 | 6/2010 |
| WO | WO 2012/048122 A1 | 4/2012 |
| WO | WO 2013/067507 A1 | 5/2013 |
| WO | WO 2013/163185 A1 | 10/2013 |

OTHER PUBLICATIONS

Non-Final Office Action for U.S. Appl. No. 15/172,123 (dated Jul. 23, 2018).
Office Action for Indian Patent Application Serial No. 5233/CHENP/2011 (dated Sep. 24, 2018).
Advisory Action for U.S. Appl. No. 13/118,046 (dated May 31, 2019).
Final Office Action for U.S. Appl. No. 12/406,916 (dated Apr. 24, 2019).
Advisory Action for U.S. Appl. No. 15/172,123 (dated Apr. 11, 2019).
Decision to Refuse a European Patent application for European Patent Application No. 09833865.0 (dated Mar. 27, 2019).
Notification of the First Office Action for Chinese Patent Application Serial No. 201610238147.3 (dated Mar. 5, 2019).
Brief Communication for European Patent Application No. 09837222.0 (dated Jan. 16, 2018).

(56) References Cited

OTHER PUBLICATIONS

Advisory Action for U.S. Appl. No. 12/406,916 (dated Jan. 10, 2018).
Office Action for Canadian Patent Application No. 2,734,176 (dated Nov. 29, 2017).
Notification of the First Office Action for Chinese Patent Application Serial No. 201610770773.7 (dated Dec. 29, 2018).
Final Office Action for U.S. Appl. No. 13/453,707 (dated Feb. 23, 2018).
Summons to attend oral proceedings pursuant to Rule 115(1) EPC for European Patent Application No. 10754103.9 (Feb. 19, 2018).
Decision to refuse a European Patent application for European Patent Application No. 09 837 222.0 (dated Jan. 25, 2018).
Summons to attend oral proceedings pursuant to Rule 115(1) EPC for European Patent Application No. 15165149.4 (Jan. 19, 2018).
Communication pursuant to Article 94(3) EPC for European Patent Application No. 09 833 865.0 (dated Dec. 11, 2017).
Final Office Action for U.S. Appl. No. 12/406,916 (dated Oct. 24, 2017).
Non-Final Office Action for U.S. Appl. No. 13/453,707 (dated Oct. 2, 2017).
Decision to refuse a European Patent application for European Patent Application No. 12 846 583.8 (dated Sep. 26, 2017).
Result of consultation for European Patent Application No. 12 846 583.8 (Sep. 22, 2017).
Communication pursuant to Article 94(3) EPC for European Patent Application No. 13 780 892.9 (dated Aug. 31, 2017).
Result of consultation for European Patent Application No. 12 846 583.8 (Aug. 4, 2017).
Final Office Action for U.S. Appl. No. 13/453,707 (dated Mar. 22, 2019).
Notification of the First Office Action for Chinese Patent Application Serial No. 201610545858.5 (dated Mar. 1, 2019).
Summons to attend oral proceedings pursuant to Rule 115(1) EPC for European Application Serial No. 13780892.9 (Feb. 28, 2019).
White, "How Computers Work," Seventh Edition, pp. 1-44 (2004).
Notice of Allowance for Canadian Patent Application Serial No. 2,734,176 (dated Nov. 20, 2018).
Decision to refuse a European Patent application for European Patent Application Serial No. 15 165 149.4 (dated Nov. 16, 2018).
Non-Final Office Action for U.S. Appl. No. 13/453,707 (dated Sep. 4, 2018).
First Examination Report for India Patent Application Serial No. 1560/CHENP/2011 (dated Oct. 30, 2018).
Non-Final Office Action for U.S. Appl. No. 12/406,916 (dated Oct. 4, 2018).
Decision to refuse a European Patent application for European Patent Application Serial No. 10 754 103.9 (dated Aug. 10, 2018).
Summons to attent oral proceedings pursuant to Rule 115(1) EPC for European Patent Application Serial No. 09833865.0 (Jul. 23, 2018).
Advisory Action for U.S. Appl. No. 13/453,707 (dated Jun. 14, 2017).
Summons to attend oral proceedings pursuant to Rule 115(1) EPC for European Application No. 09837222.0 (dated May 31, 2017).
Notice of Allowance and Fee(s) due for U.S. Appl. No. 13/669,346 (dated May 4, 2017).
Non-Final Office Action for U.S. Appl. No. 12/406,916 (dated Apr. 10, 2017).
Final Office Action for U.S. Appl. No. 13/453,707 (dated Mar. 31, 2017).
Communication pursuant to Article 94(3) EPC for European Application No. 15 165 149.4 (dated Mar. 22, 2017).
Decision to refuse a European Patent application for European Application No. 11 804 128.4 (dated Mar. 8, 2017).
Notice of Allowance for Canadian Patent Application No. 2,755,832 (dated Feb. 27, 2017).
Advisory Action for U.S. Appl. No. 13/669,346 (dated Feb. 10, 2017).
Canadian Office Action for Canadian Application No. 2,734,176 (dated Dec. 21, 2016).
Final Office Action for U.S. Appl. No. 13/669,346 (dated Dec. 1, 2016).
Notice of Decision from Post-Prosecution Pilot Program (P3) Conference for U.S. Appl. No. 12/406,916 (dated Oct. 20, 2016).
Summons to attend oral proceedings pursuant to Rule 115(1) EPC for European Application No. 12846583.8 (dated Oct. 10, 2016).
Advisory Action for U.S. Appl. No. 13/170,903 (dated Aug. 22, 2016).
Non-Final Office Action for U.S. Appl. No. 13/669,346 (dated Jul. 25, 2016).
Communication pursuant to Article 94(3) EPC for European Application No. 10 754 103.9 (dated Jul. 14, 2016).
Final Office Action for U.S. Appl. No. 12/406,916 (dated Jul. 1, 2016).
Examiner's Answer for U.S. Appl. No. 12/651,420 (dated Jul. 1, 2016).
Non-Final Office Action for U.S. Appl. No. 13/211,082 (dated Jun. 17, 2016).
Final Office Action for U.S. Appl. No. 13/170,903 (dated Jun. 2, 2016).
Decision of Reexamination for Chinese Application No. 200980140368.5 (dated May 30, 2016).
Non-Final Office Action for U.S. Appl. No. 13/453,707 (dated May 19, 2016).
Decision to Refuse a Patent (Final Rejection) for Korean Patent Application No. 10-2011-7009841 (dated May 13, 2016).
Communication pursuant to Article 94(3) EPC for European Patent Application No. 09 837 222.0 (dated Apr. 18, 2016).
Advisory Action Before the Filing of an Appeal Brief for and Applicant-Initiated Interview Summary for U.S. Appl. No. 13/669,346 (dated Apr. 18, 2016).
Office Action for Canadian Patent Application No. 2,755,832 (dated Apr. 6, 2016).
Notice of Grant for Chinese Patent Application No. 200980157050.8 (dated Feb. 3, 2016).
Communication pursuant to Article 94(3) EPC for European Patent Application No. 12846583.8 (dated Jan. 22, 2016).
Extended European Search Report for European Application No. 13780892.9 (dated Jan. 15, 2016).
Office Action for Canadian Application No. 2,734,176 (dated Jan. 6, 2016).
Final Office Action for U.S. Appl. No. 13/669.346 (dated Dec. 30, 2015).
Notification of the Reexamination for Chinese Application No. 200980140368.5 (dated Oct. 28, 2015).
Certificate of Grant for Australian Patent Application No. 2009282041 (dated Oct. 22, 2015).
Oral Hearing Notice for Indian Patent Application No. 1752/CHENP/2009 (dated Oct. 13, 2015).
Third Office Action for Chinese Patent Application No. 200980157050.8 (dated Oct. 9, 2015).
Notification of European publication No. and information on the application of Article 67(3) EPC for European Patent Application No. 15165149.4 (dated Sep. 30, 2015).
Restriction and/or Election Requirement for U.S. Appl. No. 13/453,707 (dated Sep. 16, 2015).
Extended European Search Report for European Application No. 15165149.4 (dated Aug. 27, 2015).
Advisory Action Before the Filing of an Appeal Brief for U.S. Appl. No. 12/651,420 (dated Aug. 17, 2015).
Non-Final Office Action for U.S. Appl. No. 13/669,346 (dated Jul. 15, 2015).
Notice of Acceptance for Australian Application No. 2009282041 (dated Jun. 29, 2015).
Non-Final Office Action for U.S. Appl. No. 12/406,916 (dated Jun. 19, 2015).
Decision to grant a European patent pursuant to Article 97(1) EPC for European Application No. 07836358.7 (dated Jun. 18, 2015).
Advisory Action, Applicant-Initiated Interview Summary, & AFCP 2.0 Decision for U.S. Appl. No. 13/669,346 (dated Jun. 15, 2015).

(56) References Cited

OTHER PUBLICATIONS

Extended European Search Report for European Patent Application No. 12846583.8 (dated May 19, 2015).
Final Office Action for U.S. Appl. No. 12/651,420 (dated May 4, 2015).
Notification of Decision to Grant or Register for ARIPO Application No. AP/P/2011/005619 (dated Apr. 28, 2015).
Second Office Action for Chinese Patent Application No. 200980157050.8 (dated Apr. 1, 2015).
Final Office Action for U.S. Appl. No. 13/669,346 (dated Feb. 20, 2015).
Communication of European publication No. and information on the application of Article 67(3) EPC for European Application No. 13780892.9 (dated Feb. 4, 2015).
Applicant-Initiated Interview Summary for U.S. Appl. No. 12/651,420 (dated Jan. 26, 2015).
Communication under Rule 71(3) EPC for European Patent Application No. 07836358.7 (dated Dec. 17, 2014).
Non-Final Office Action for U.S. Appl. No. 13/669,346 (dated Sep. 18, 2014).
Non-Final Office Action for U.S. Appl. No. 12/651,420 (dated Sep. 3, 2014).
Communication of European publication number and Information on the application of Article 37(3) EPC for European Application No. 12846583.8 (dated Aug. 13, 2014).
Notification of the First Office Action for Chinese Application No. 200980157050.8 (dated Aug. 4, 2014).
Examination Report for ARIPO Patent Application No. AP/P/2011/005619 (dated Jul. 30, 2014).
Communication under Rule 71(3) EPC for European Patent Application No. 07836358.7 (dated Jul. 2, 2014).
Examination Report for Australian Patent Application No. 2009282041 (dated Jun. 12, 2014).
Communication pursuant to Article 94(3) EPC for European Application No. 09 837 222.0 (dated Apr. 23, 2014).
Notification of the Third Office Action for Chinese Application No. 200980140368.5 (dated Apr. 8, 2014).
Office Action for Indian Application No. 1752/CHENP/2009 (dated Mar. 27, 2014).
Decision to Refuse for European Application No. 09 807 223.4 (dated Mar. 18, 2014).
Notice of Allowance for Mexican Patent Application No. MX/a/2011/001622 (dated Feb. 20, 2014).
Extended European Search Report for European Application No. 09833865.0 (dated Dec. 12, 2013).
Result of Consultation for European Application No. 09 807 223.4 (dated Dec. 6, 2013).
Communication pursuant to Article 94(3) EPC for European Application No. 09 837 222.0 (dated Oct. 21, 2013).
Third Office Action for Mexican Patent Application No. MX/a/2011/001622 (dated Oct. 11, 2013).
Summons to attend oral proceedings pursuant to Rule 115(1) EPC for European Application No. 09807223.4 (Sep. 25, 2013).
Notification of Transmittal of the International Search Report and the Written Opinion of the International Searching Authority, or the Declaration for International Application No. PCT/US2013/037803 (dated Aug. 21, 2013).
Final Office Action for U.S. Appl. No. 12/651,420 (dated Aug. 2, 2013).
Result of consultation for European Application No. 07 836 358.7 (dated Jul. 18, 2013).
Notice of Allowance and Fee(s) Due for U.S. Appl. No. 12/190,564 (dated Jul. 10, 2013).
Result of Consultation for European Patent Application No. 07836358.7 (dated Jul. 5, 2013).
Second Office Action for Chinese Patent Application No. 200980140368.5 (dated Jun. 4, 2013).
Memo Concerning the Official Action for Mexican Patent Application No. MX/a/2011/001622 (dated Apr. 29, 2013).

Notification of Transmittal of the International Search Report and the Written Opinion of the International Searching Authority, or the Declaration for International Patent Application No. PCT/US2012/063568 (dated Mar. 26, 2013).
Communication Pursuant to Article 94(3) Epc for European Patent Application No. 09807223.4 (dated Mar. 14, 2013).
European Search Report for European Patent Application No. 09837222.0 (dated Feb. 12, 2013).
Summons to Attend Oral Proceedings for European Patent Application No. 07836358.7 (Feb. 11, 2013).
Final Office Action for U.S. Appl. No. 12/190,564 (dated Jan. 11, 2013).
Memo Concerning the Official Action for Mexican Patent Application No. MX/a/2011/001622 (dated Oct. 16, 2012).
Non-Final Official Action for U.S. Appl. No. 12/651,420 (dated Sep. 12, 2012).
Final Official Action for U.S. Appl. No. 12/406,916 (dated Sep. 4, 2012).
European Search Report for European Application No. 10754103.9 (dated Aug. 20, 2012).
Chinese Patent Application No. 200780040617.4 for Notice of Granting Patent Right for Invention (dated Aug. 3, 2012).
First Office Action for Chinese Patent Application No. 200980140368.5 (dated Jul. 30, 2012).
Communication pursuant to Article 94(3) EPC for European Application No. 07 836 358.7 (dated Jul. 4, 2012).
Non-Final Official Action for U.S. Appl. No. 12/190,564 (dated Jun. 4, 2012).
Extended European Search Report for European Application No. 09807223.4 (dated Jun. 1, 2012).
Supplemental Notice of Allowability for U.S. Appl. No. 12/340,568 (dated Feb. 6, 2012).
Second Office Action for Chinese Patent Application No. 200780040617.4 (dated Jan. 18, 2012).
Notification of Transmittal of the International Search Report and the Written Opinion of the International Searching Authority, or the Declaration for International Application No. PCT/US2009/068875 (dated Jan. 18, 2012).
Communication of European publication number and information on the application of Article 67(3) EPC for Application No. 10754103.9 (dated Dec. 29, 2011).
Notice of Allowance and Fee(s) Due for U.S. Appl. No. 12/340,568 (dated Dec. 20, 2011).
Declaration of Mohammad Khan for U.S. Appl. No. 12/340,568 (dated Dec. 15, 2011).
C-SAM's Answer to Defendant's Counterclaims in the United States District Court for the District of Delaware for Civil Action No. C.A. No. 11-881-GMS (dated Dec. 15, 2011).
Communication of European publication number and information on the application of Article 67(3) EPC for European Application No. 09833865.0 (dated Dec. 7, 2011).
Vivotech, Inc.'s Answer, Defenses and Counterclaims in the United States District Court for the District of Delaware for Civil Action No. C.A. No. 11-881-GMS (dated Nov. 21, 2011).
Final Official Action for U.S. Appl. No. 12/190,564 (dated Oct. 28, 2011).
Non-Final Official Action for U.S. Appl. No. 12/406,916 (dated Oct. 5, 2011).
Communication of European publication number and information on the application of Article 67(3) EPC for European Application No. 09837222.0 (dated Sep. 28, 2011).
Extended European Search Report for European Application No. 07836358.7 (dated Sep. 22, 2011).
Non-Final Official Action for U.S. Appl. No. 12/340,568 (dated Aug. 8, 2011).
Non-Final Official Action for U.S. Appl. No. 12/190,564 (dated May 24, 2011).
First Office Action for Chinese Patent Application No. 200780040617.4 (dated Apr. 8, 2011).
Notification of Transmittal of the International Search Report and the Written Opinion of the International Searching Authority, or the Declaration for International Application No. PCT/US2010/027801 (dated Oct. 21, 2010).

(56) References Cited

OTHER PUBLICATIONS

Notification of Transmittal of the International Search Report and the Written Opinion of the International Searching Authority, or the Declaration for International Application No. PCT/US2009/069971 (dated Jul. 30, 2010).
Notification of Transmittal of the International Search Report and the Written Opinion of the International Searching Authority, or the Declaration for International Application No. PCT/US2009/053556 (dated Apr. 5, 2010).
Langer et al., "Anwendungen und Technik von Near Field Communication (NFC)," Springer, 275 pages (2010).
Communication of European Publication number and Information on the Application of Article 67(3) EPC for European application No. 07836358.7 (dated Apr. 29, 2009).
Terry, "Restaurants aim to boost sales with mobile apps," Nations's Restaurants News, pp. 1-6, (Mar. 2, 2009).
Notice of Allowability for U.S. Patent Applicaton U.S. Appl. No. 11/514,698 (dated Nov. 17, 2008).
Notice of Allowance and Fee(s) Due for U.S. Appl. No. 11/514,698 (dated Aug. 28, 2008).
Notification of Transmittal of the International Search Report and the Written Opinion of the International Searching Authority, or the Declaration for International Application No. PCT/US07/17091 (dated Jun. 26, 2008).
Data Management, EMV Integrated Circuit Card Specifications for Payment Systems, Book 4: Cardholder, Attendant, and Acquirer Interface Requirements, Version 4.2, pp. 81-94, (Jun. 2008).
"Idea: OnlineSecure Electronic Prepaid Virtual Debit Card," http://www.ideablob.com, 3 pages (Copyright 2007-2009).
"ViVOnfc Suite," ViVOtech Products, http://www.vivotech.com/products/vivo_nfc/ index.asp, pp. 1-2 (Dec. 31, 2006).
"Giesecke & Devrient provides over the air personalization for handsets with PayPass," NFCNews, pp. 1-2 (dated Apr. 13, 2006).
"Identification cards—Integrated circuit cards—Part 4: Organization, security and commands for interchange," ISO/IEC 7816-4, Second Edition, pp. 1-90 (dated Jan. 15, 2005).
"Information technology—Telecommunications and information exchange between systems—Near Field Communications—Interface and Protocol (NFCIP-1)," ISO/IEC 18092, pp. 1-66 (dated Apr. 1, 2004).
"Identification cards—Contactless integrated circuit(s) cards—Proximity cards—Part 2: Radio frequency power and signal interface," ISO/IEC 14443-2, pp. 1-10 (dated Jul. 22, 2003).
"Information technology—Identification cards—Integrated circuit(s) cards with contacts—Part 5: Registration of application providers," ISO/IEC 7816-5.2, pp. 1-12 (dated Jan. 17, 2003).
"Information technology—Identification cards—Integrated circuit(s) cards with contacts—Part 4: Interindustry commands for interchange," ISO/IEC 7816-4, pp. 1-85 (dated Jan. 17, 2003).
"Identification cards—Contactless integrated circuit(s) cards—Proximity cards—Part 4: Transmission protocol," ISO/IEC 14443-4, pp. 1-39 (dated Mar. 10, 2000).
"Identification cards—Contactless integrated circuit(s) cards—Proximity cards—Part 3: Initialization and anticollision," ISO/IEC 14443-3, pp. 1-48 (dated Jun. 11, 1999).
"Mobile Money Transfer Fact Sheet," Western Union, http://corporate.westernunion.com/news_media_MobileMoney.html, 1 page (Copyright 2001-2009).
"EMO™ Electric Money Orders—How EMO Works," https://www.emocorp.com, 1 page (Copyright 1999-2009).
"EMO™ Electric Money Orders — Options for Moving Your Money with EMO," https://www.emocorp.com, 1 page (Copyright 1999-2009).
"Mobile Payments with PayPal—Send Money from Your Mobile Phone," https://www.paypal.com, 1 page, (Copyright 1999-2009).
"PayPal Mobile FAQ," https://www.paypal.com, 2 pages (Copyright 1999-2009).
"Texting with PayPal—Easy as Lifting a Finger," https://www.paypal.com, 2 pages (Copyright 1999-2009)
"Identification cards—Integrated circuit(s) cards with contacts—Part 5: Numbering system and registration procedure for application identifiers," ISO/IEC 7816-5, Amendment 1, pp. 1-8 (dated Dec. 15, 1996).
"Identification cards—Integrated circuit(s) cards with contacts—Part 5: Numbering system and registration procedure for application identifiers," ISO/IEC 7816-5, First Edition, pp. 1-12 (dated Jun. 15, 1994).

\* cited by examiner

METHODS, SYSTEMS, AND COMPUTER READABLE MEDIA FOR PROVISIONING AND UTILIZING AN AGGREGATED SOFT CARD ON A MOBILE DEVICE

PRIORITY CLAIM

This application is a continuation of U.S. patent application Ser. No. 13/669,346, filed Nov. 5, 2012 which claims the benefit of U.S. Provisional Patent Application Ser. No. 61/555,279, filed Nov. 3, 2011, the disclosures of which are incorporated herein by reference in their entireties.

TECHNICAL FIELD

The subject matter described herein relates to wireless devices conducting payment and non-payment transactions. More particularly, the subject matter described herein relates to methods, systems, and computer readable media for provisioning and utilizing an aggregated soft card on a mobile device.

BACKGROUND

At present, consumers may carry several plastic payment and non-payment cards associated with various business and non-business entities in their physical wallets. Exemplary physical cards include plastic credit cards, debit cards, charge cards, prepaid cards, check cards, loyalty cards, offers, vouchers, coupons, transit tickets, entertainment tickets, stored value tickets, driver's licenses, passports, identification cards, travel documents, automobile insurance cards, club membership cards, and the like. In order to reduce the number of physical cards carried by a consumer, a card issuer can offer a physical account card that includes a combination of both its brand card and at least one other card type, such a merchant specific payment card, a merchant specific loyalty card, a transit card, and the like. For example, one wholesale club merchant offers a plastic card that combines an executive member loyalty account number (e.g., a merchant membership card) with a credit card account number (e.g., a branded credit card) on the same physical card. Such a dual purpose card can be readily issued with a plastic card.

In order to reduce the number of physical cards that are carried, many consumers have instead provisioned their mobile devices with soft card versions (i.e., virtual representation that includes associated credentials) of the aforementioned physical cards for their convenience. This option enables consumers to use one or more separate individual soft cards at a particular merchant or non-merchant location based on a number of factors, such as current promotions, card acceptance, card preferences, and loyalty programs. For instance, a user may use each of an electronic coupon, an electronic loyalty card, and a payment card at a store. However, each of these three soft cards is used separately in sequence (i.e., three separate taps on a wireless device reader) during a single wireless transaction. Although the issuing of a dual purpose soft card is desirable, communication and compatibility problems can arise when utilizing a soft card version. Notably, the interfacing of a dual purpose card with a near field communication (NFC) enabled mobile device may be prohibitive since the protocols and message formats used for a branded credit card (e.g., an open loop card) may differ from the protocols and message formats associated with a merchant specific card (e.g., a closed loop card).

Accordingly, there exists a need for methods, systems, and computer readable media for provisioning and utilizing an aggregated soft card on a mobile device.

SUMMARY

According to one aspect, the subject matter described herein includes methods, systems, and computer readable media for provisioning and utilizing an aggregated soft card on a mobile device. One method includes receiving a request for an aggregated soft card from a mobile device, wherein the aggregated soft card includes a primary component soft card and at least one secondary component soft card. The method also includes requesting component soft card data associated with each of the primary component soft card and the at least one secondary component soft card from a plurality of issuing system servers. The method further includes generating aggregated soft card data by establishing a link among the component soft card data received from the plurality of issuing system servers and sending the aggregated soft card data to the mobile device.

As used herein, the terms "mobile device", "wireless mobile device" and "NFC enabled mobile device" may refer to any device with near field communication (NFC), radio frequency (RF) communication, and/or barcode capturing capabilities. One exemplary mobile device includes a mobile smart phone, i.e. a cellular smart phone. In near field communication, a mobile device may wirelessly communicate with a passive wireless transceiver, or smart tag, located on or in the smart poster via inductive coupling of the smart tag antenna to the NFC enabled mobile device antenna. The wireless mobile device may also communicate via NFC with a wireless device reader in a similar fashion (i.e., via inductive coupling). As used herein, the term "wireless communications" may include communications conducted at ISO 14443 and ISO 18092 interfaces. Namely, wireless communications over an NFC link may be established using a card emulation mode (e.g., in accordance with ISO 14443) or a peer to peer mode (e.g. in accordance with ISO 18092) of communication. These specifications define communication protocols for wireless smart devices operating in close proximity with a reader antenna. In one embodiment, wireless communications can communicate applications that are uniquely identified by an application identifier (AID), defined by the ISO/IEC 7816 specification. Application to terminal interface requirements are also defined in book 4 of the Europay MasterCard Visa (EMV) 4.2 specification. Wireless communications may also include communications via Bluetooth, WiFi, or WiMax.

As used herein, an AID may include a 16 byte data structure defined according to ISO/IEC 7816-4. The first five bytes of a given AID correspond to a registered identifier (RID) which uniquely identifies a specific payment or non-payment application provider. For example, the first five bytes can identify a payment application provided by VISA®, MasterCard®, American Express®, or any other suitable payment or non-payment merchant provider application. An optional field within a given AID can be assigned by the application provider, or registrant, and can include up to the remaining 11 bytes of information. The information can include object or transaction data used in processing the payment or non-payment transaction application. This field is known as a Proprietary Application Identifier Extension (PIX) and may contain any 0-11 byte value specified by the provider. The PIX portion can typically define object data for one application to be processed at a wireless device reader. The meaning of this field is defined only for the specific RID and need not be unique across different RIDs. In one embodiment, the RID and PIX portions of AIDs and/or are accessed by a wireless device reader upon interfacing with a mobile device.

The subject matter described herein may be implemented in software, in combination with hardware and/or firmware. For example, the subject matter described herein may be implemented in software executed by a hardware processor. In one exemplary implementation, the subject matter described herein for provisioning and utilizing an aggregated soft card on a mobile device may be implemented using a non-transitory computer readable medium having stored thereon executable instructions that when executed by the hardware processor of a computer control the computer to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
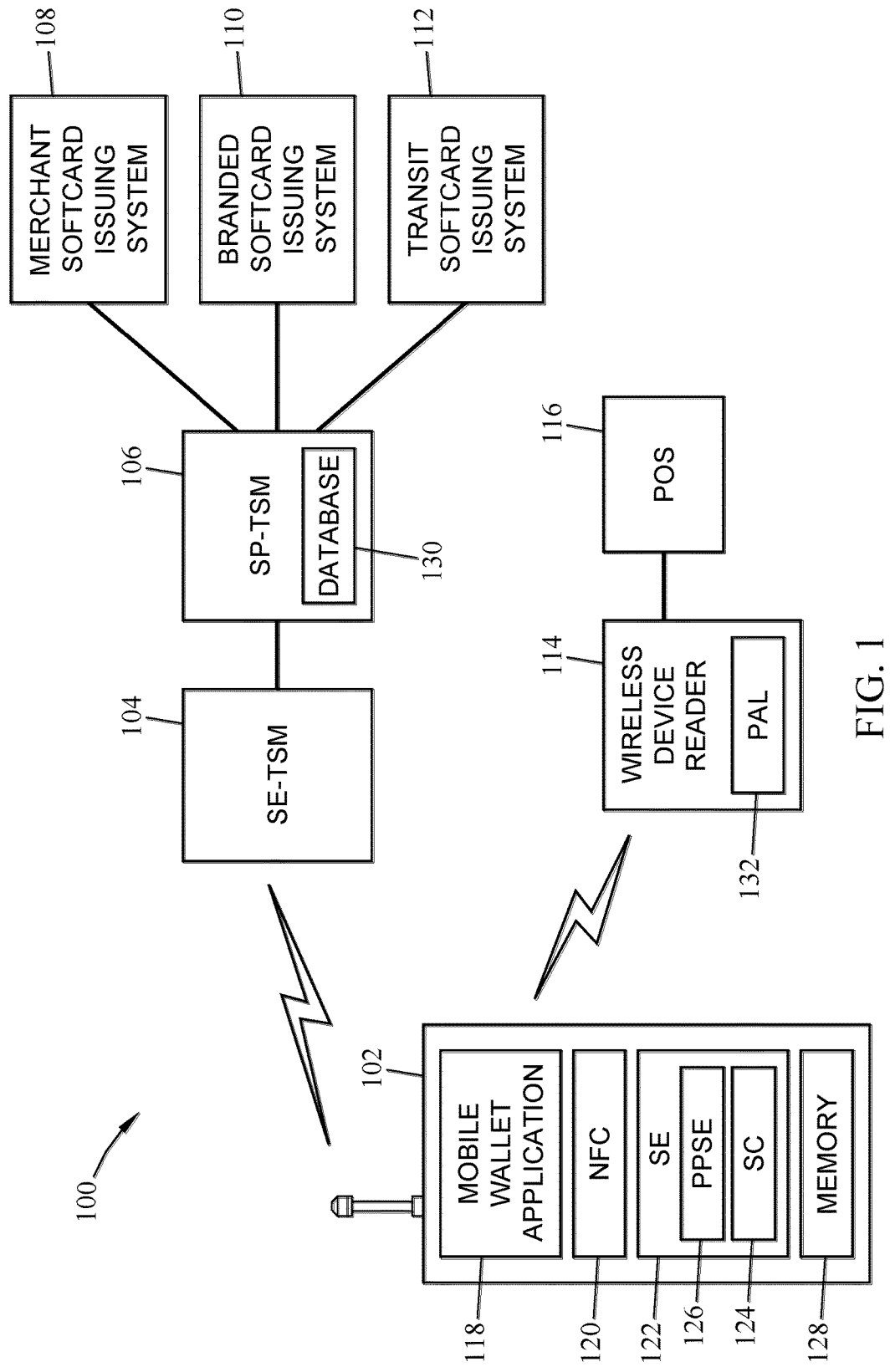
FIG. 1 is a block diagram illustrating an exemplary system for provisioning and utilizing an aggregated soft card on a mobile device according to an embodiment of the subject matter described herein.

The present subject matter describes various methods, systems, and computer readable media for provisioning and utilizing an aggregated soft card on a mobile device. In one embodiment, the present subject matter includes an issuer server, such as a service provider trusted service manager (SP-TSM) server, receives a request from a mobile device for an aggregated soft card. As used herein, the term "soft card" is intended to include an electronic and/or virtual based application or applet that includes credential, authentication, and account information to conduct a wireless payment or non-payment transaction (e.g., a virtual credit card) that may be visually displayed on a mobile device screen. A soft card may be electronically provisioned on a mobile device (i.e., not a plastic card). Similarly, as used herein, the term "aggregated soft card" is intended to comprise a combination of two or more electronic/virtual cards (i.e., component soft cards) that are logically linked as a single aggregated soft card that is depicted/displayed on a mobile device as a single visual representation (e.g., an icon, symbol, image, graphic, displayed name, etc.). In one embodiment, an aggregated soft card is offered by a card issuing entity that may want to offer a soft card under its brand while being coupled with at least one other type of soft card. Some aggregated soft card combinations include, but are not limited to, i) a merchant soft card and a branded (e.g., a Mastercard) soft card, ii) a branded soft card and a merchant loyalty soft card, iii) a branded soft card and a transit soft card, and iv) a merchant prepaid soft card and a branded soft card.

Upon receiving the request for the aggregated soft card, the issuer server may determine the separate underlying component soft cards that constitute the aggregated soft card and send a request to corresponding issuing system servers that host the respective soft card data content. Each respective issuing system server may then respond by sending the requested soft card data content to the issuer server, which subsequently combines and links all of the soft card data content to generate an aggregated soft card. The aggregated soft card (and/or data associated with the aggregated soft card) may then be provided to the requesting mobile device directly or via a secure element trusted service manager (SE-TSM) server.

The present subject matter is advantageous because it allows, for example, a consumer use a single electronic payment card instead of deciding between two soft cards, each of which is associated with a different merchant or entity. The manner for selecting a particular virtual component soft card in the aggregated soft card may be determined between a card issuer and various merchants based on their respective business relationship. For example, the relationship may be linked to a merchant labeling card scheme that allows participating merchants to pay lower transaction fees, and where other merchants that are not in a business arrangement/relationship with the card issuer may pay a normal (i.e., higher) transaction fee.

FIG. 1 depicts a system 100 configured for provisioning and utilizing an aggregated soft card on a mobile device. System 100 may include a mobile device 102, a secure element trusted service manager (SE-TSM) server 104, a service provider trusted service manager (SP-TSM) server 106, a plurality of soft card issuing system servers 108-112, a wireless device reader 114, and a point of sale terminal 116 (or any other type of payment or non-payment transaction terminal). Mobile device 102 may include an NFC module 120, mobile wallet application 118, memory 128, and a secure element 122, which may comprise a universal integrated circuit card (UICC), a secure add-on memory card, an embedded secure element integrated chipset, a SIM card, a microSD card, a trust zone, or the like. In one embodiment, secure element 122 may be configured to securely store one or more soft cards and/or aggregated soft cards.

In one embodiment, mobile device 102 may include an NFC enabled handset device such as an NFC enabled mobile wireless device (e.g., an NFC enabled smart phone), an NFC enabled tablet, a wireless smart card, a contactless smart card, or any other device that is equipped with an NFC module 108 or chipset that enables mobile device 102 to conduct NFC or wireless communications with other NFC or wireless enabled devices (e.g., wireless device reader 114). Alternatively, mobile device 102 may also include a non-NFC enabled mobile device, such as a WiFi enabled or Bluetooth enabled mobile device. Mobile device 102 may also be provisioned with a secure element 122 that includes a proximity payment system environment (PPSE) application 126 configured for storing a plurality of application identifiers (AIDs) that respectively identify and correspond to transaction applications (e.g., component soft cards and aggregated soft cards) stored in secure memory.

In one embodiment, PPSE application 126 may include an application for maintaining a priority listing of transaction application identifiers that correspond to transaction applications hosted or stored on wireless device 102. In one embodiment, secure element 122 includes a secure element (SE) memory, where PPSE application 126 may be accessed during a secure and authenticated session. Notably, PPSE application 126 includes multiple stored application identifiers (AIDs) that respectively identify and correspond to applications (e.g., soft cards) stored in memory 128. Application identifiers may also be stored in other areas local to wireless device 102, such as in memory 128, in an applet (not shown), or some other location separate from the PPSE application 126 that is also accessible by wireless device reader 114. In one embodiment, AIDs may identify and correspond to a payment or non-payment soft card applications located on device 102. Application data associated with the soft card applications may be accessed and processed by an AIDs selection module (not shown) to conduct a wireless (payment or non-payment) transaction.

In one embodiment, SE-TSM server 104 may include any server or network element that is associated with a mobile network operator (MNO) and is configured to manage a secure element via over the air (OTA) communications. SE-TSM server 104 may perform management tasks by issuing card content management operations. Card content management operations may include loading a file, installing an application (e.g., a service applet) or a supplementary security domain (SSD), deleting an application or SSD, blocking an application or SSD, or unblocking an application or SSD on the secure element of a mobile device. Notably, SE-TSM server 104 may be configured to access and manage secure element 122 residing in wireless mobile devices.

In one embodiment, SP-TSM server 106 may include any server or network element that is associated with a service provider (e.g., a bank, a credit card company, etc.) and is configured to conduct an integration process (i.e., establishing a secure communication channel) with SE-TSM server 104. SP-TSM server 106 may be configured to provide aggregated soft card data to SE-TSM server 104 to be provisioned in secure element 122 via a secure communication channel. SP-TSM server 106 may be provisioned with a database 130 that contains aggregated soft card identifiers (and associated component soft card data) and address information corresponding to soft card issuing system servers, such as servers 108-112.

In one embodiment, wireless reader device 114 may be used to define a list of application identifiers (i.e., "App IDs" or "AIDs") that identify transaction applications (i.e., soft cards) a merchant entity prefers and is willing to accept in a wireless transaction (i.e., applications that are compatible with wireless reader device 114). Although the following description details purchase/payment transactions, non-payment transactions may be conducted in a similar manner without departing from the scope of the present subject matter. Non-payment transactions may include, without limitation, use of applications for loyalty cards, loyalty points, coupons, ordering information, promotions, personal preferences, personalized data, product return information, ticket redemption, and/or any other suitable application or combinations thereof used to conduct a non-payment transaction at point of sale terminal 116.

In one embodiment, the aforementioned AIDs data may be populated into a preference list that is stored on wireless reader device 114 called a Preferred Application List (PAL) 132. Once assigned and grouped to a PAL based on type, the AIDs are assigned priority level indicators and become preferred application identifiers. PAL 132 may indicate the preferred soft card applications a merchant entity wishes to accept for conducting a wireless transaction. In one embodiment, a merchant entity may designate the priority level indicators using POS terminal 116. Wireless reader device 114 may be able to support one or more PALs, wherein each PAL is configured to store different types of application data in respective priority orders. For example, a PAL-1 may be configured to hold a priority listing of AIDs that identify a respective plurality of accepted electronic payment card applications that are compatible for processing by wireless reader device 114. Similarly, a PAL-2 may be configured to hold one or more AIDs that identify a respective plurality of accepted electronic loyalty card applications and a PAL-3 may be configured to hold a priority listing of AIDs that identify a respective plurality of accepted electronic coupon applications. In one embodiment, PAL-2 may be configured to simply hold a single AID corresponding to a loyalty card application associated with the location of reader 114 (e.g., a grocery store loyalty card AID held in PAL-2 of a reader located at the grocery store location). Device reader 114 may also be configured with additional PALs (e.g., PAL-N) to hold a priority listing of AIDS that identify other accepted transaction applications (e.g., transit cards, healthcare cards, etc.).

In one embodiment of the present subject matter, a mobile wireless device user may use mobile device 102 to request an aggregated soft card from a backend server (e.g., SP-TSM 106) associated with a merchant or non-merchant entity. As mentioned above, an aggregated soft card may include a plurality of component soft cards (e.g., virtual cards or data entities) that can be used to conduct a wireless payment or non-payment transaction and is electronically provisioned on a wireless mobile device. Exemplary component soft cards include, but are not limited to, a virtual gift card, a virtual loyalty card, a virtual prepaid card, a virtual coupon, a virtual ticket, a virtual boarding pass, a virtual transit card, a virtual credit card, a virtual debit card, a virtual payment card, a virtual charge card, a virtual voucher, a virtual membership card, a virtual health insurance card, a virtual reward card, a virtual business card, a virtual access pass, a virtual automotive insurance card, a virtual pharmacy card, a virtual library card, a virtual passport, and the like.

In one embodiment, mobile device 102 may be configured to request an aggregated soft card from SP-TSM 106 (either directly or via a trigger management server (TMS) configured to receive and route requests to SP-TSM 106). In one embodiment, mobile device 102 may send the aggregated soft card request to SP-TSM 106 by obtaining the backend server address information (e.g., a uniform resource locator (URL) or a uniform resource identifier (URI) from a smart poster, a smart tag, a bar code, a quick response (QR) code, or the like. The aggregated soft card request may include the SP-TSM address information, aggregated soft card identification information, and/or mobile subscriber identification information (associated with the mobile subscriber and/or mobile device 102). In one embodiment, mobile device 102 may include an NFC module 120 that is configured to obtain the address information by conducting NFC communications with other NFC enabled devices such as a smart tag, smart poster, or wireless device reader 106. In one embodiment, NFC module 120 may be embodied either as a hardware based radio chipset or a software based module executed by a hardware processor (not shown) that is coupled to the antenna(s) of mobile device 102. Mobile device 102 may also be provisioned with a camera device (not shown) which may be used to scan and read QR codes containing address information and aggregated soft card identification information regarding SP-TSM 106.

After the address information (e.g., a URL address, internet protocol (IP) address, URI address, tag identification number, etc.) associated with SP-TSM 106 is obtained, mobile device 102 may wirelessly send an aggregated soft card identifier (e.g., also obtained from a smart tag, smart poster, or incorporated in the QR code) to SP-TSM 106. In one embodiment, a mobile wallet application 118 in mobile device 102 is configured to contact SP-TSM 106 using the address information by sending the aggregated soft card request message. In one embodiment, mobile wallet application 118 may reside in a memory element of mobile device 102. Although FIG. 1 depicts mobile wallet application 118 as a standalone element, mobile wallet application 118 may be stored in either secure element 122 of mobile device 102 or in a non-secure baseband memory (e.g., memory 128) without departing from the scope of the present subject matter.

In one embodiment, mobile wallet application 118 may include a software application or module (e.g., a MIDlet application) that when executed by a hardware based processor in mobile device 102 is capable of performing various functionalities. For example, mobile wallet application 118 may utilize and manage soft cards stored on mobile device 102. Payment credentials, such as electronic payment soft cards including credit or debit cards may also be stored in within mobile wallet application 118. Alternatively, the aggregated soft card may be requested by a mobile banking application provisioned on mobile device 102, a direct request originating from mobile wallet application 118, via an online website of a bank/merchant using a web browser on mobile device 102, or selecting an ad/offer displayed on the screen of mobile device 102.

Upon receiving the aggregated soft card request message, SP-TSM 106 may be configured to locate the component soft cards that constitute (i.e., make up) the aggregated soft card using the aggregated soft card identifier. In one embodiment, SP-TSM 106 is configured with a database 130 that stores mappings of aggregated soft cards to their respective component soft cards. In one embodiment, component soft card data associated with the aggregated soft card data may be stored at a soft card issuing system servers 108-112 or in some other separate database or storage server. In such a scenario, SP-TSM 106 may use a soft card issuing system server identifier obtained from database 130 to determine the address or location of the appropriate issuing system server. For example, SP-TSM 106 may use the aggregated soft card identifier to access database 130 that maps aggregated soft card identifiers to address information associated with issuing system servers 108-112. In one embodiment, SP-TSM 106 may then use the mapped issuing system server address information to locate the issuing system server containing the underlying component soft card data associated with the requested aggregated soft card. Alternatively, the issuing system server address information may be provided by an interfaced smart poster, smart tag, or QR code.

One example as to how SP-TSM 106 locates the appropriate issuing system server involves mobile device 102 requesting an aggregated soft card that includes the combination of i) an open-loop (e.g., Mastercard) credit soft card, ii) a closed loop (e.g., BestBuy) credit card, and iii) a closed-loop (e.g., BestBuy) loyalty card. As used herein "closed loop" refers to a merchant or entity specific soft card that can only be utilized at the merchant or entity specific location (e.g., using a BestBuy loyalty soft card at a BestBuy location). Similarly, "open loop" refers to a non-merchant specific soft card that may be utilized at a plurality of different locations (e.g., a Mastercard credit soft card). Continuing with the example, SP-TSM 106 may utilize the aggregated soft card identifier to access database 130 to determine the addresses of the issuing system servers that respectively host/store the soft card content data for each of the Mastercard credit soft card, BestBuy credit soft card, and BestBuy loyalty soft card. For example, SP-TSM 106 may use database 130 to determine that branded soft card issuing system server 110 (e.g., a Mastercard server) hosts the Mastercard credit soft card data and merchant soft card issuing system server 108 (e.g., a BestBuy host server) hosts the BestBuy credit soft card data and the BestBuy loyalty soft card data. Although only a merchant soft card issuing system server 108, a branded soft card issuing system server 110, and a transit soft card issuing system server 112 are depicted in FIG. 1, additional soft card issuing system servers may be utilized in system 100 without departing from the scope of the present subject matter.

After identifying the appropriate soft card issuing system servers that contain the component soft card data associated with the requested aggregated soft card, SP-TSM 106 may send a request message to the identified issuing system servers. In response, each identified issuing system server may retrieve the requested component soft card data from a local or external database and subsequently forward the obtained data along with security credentials (e.g., secondary component soft card issuer key, authentication data or other security data required as an part of secondary component soft card data to complete a transaction with secondary component soft card issuer supported wireless reader) to SP-TSM 106. SP-TSM 106 may then be configured to utilize the component soft card data to create an aggregated soft card. In one embodiment, SP-TSM 106 creates a mapping table on behalf of one of the component soft cards that is designated as the "primary component soft card" or "parent soft card." The other soft cards associated with the aggregated soft card are designated as "child soft cards" or "secondary component soft cards." Notably, the mapping table may establish a linking or association between the parent soft card and children soft cards. Using the previous example, the Mastercard credit soft card may be designated as the primary component soft card of the aggregated soft card and the BestBuy credit soft card and the BestBuy loyalty soft card may be designated as secondary component soft cards of the aggregated soft card. In one embodiment, the link or association of the primary component soft cards and the secondary component soft cards may be established by a list or table that links the application identifiers (AIDs) of each of the primary and secondary component soft cards. Notably, each AID includes a field that includes a flag or indicator that designates each component soft card as a component of the aggregated soft card. In one embodiment, the PIX portion of the AID may be used to identify a component soft card. The list (i.e., an "AID linking list") also contains the component soft card AIDs in a priority order as defined by the issuer entity (e.g., the issuing entity associated with the primary soft card). The priority order is a predefined preference order that indicates the sequence in which the component soft cards should be attempted for use by mobile device 102 in a wireless transaction with a wireless device reader. In one embodiment, the AID linking list may be stored and maintained in database 130 of SP-TSM 106.

After the aggregated soft card data is generated, SP-TSM 106 may be configured to forward the aggregated soft card data, the AID linking list, and a subscriber identifier (associated with mobile device 102) to SE-TSM 104 or an over the air (OTA) provisioning server (not shown). In an alternate embodiment, SP-TSM 106 may use the subscriber identifier to provide the aggregated soft card data and the AID linking list directly to mobile device 102. In one embodiment, SP-TSM 106 may provide an image of the aggregated soft card (e.g., the image associated with the primary component soft card) along with the aggregated soft card data. The primary component soft card AID may also include a flag designating it as the primary component soft card and the AID linking list.

As indicated above, SE-TSM 104 may be configured to receive aggregated soft card data, the AID linking list, and a subscriber identifier (associated with mobile device 102) from SP-TSM 106. Using the subscriber identifier associated with mobile device 102, SE-TSM 104 may wirelessly send aggregated soft card data over the air to mobile device 102. In one embodiment, SE-TSM 104 establishes a secure communication channel/path with mobile device 102 to store the aggregated soft card data in secure element 122. SE-TSM 104 may also provide the AID linking list to mobile device 102 over the secure communication channel for storage in memory 128. In one embodiment, the AID linking list the component soft card AIDs in a priority order as defined by the issuer entity associated with the primary component soft card.

Once received from SE-TSM 104, the aggregated soft card data may be stored as an aggregated soft card 124 in secure element 122 of mobile device 102. In one embodiment, secure element 122 may reside in the processor, in the memory, or in an add-on device in mobile device 102. In an alternate embodiment, an aggregated soft card data may be stored in baseband memory 128 of mobile device 102. After receiving the aggregated soft card data, mobile device 102 may be configured use mobile wallet application 118 to graphically display aggregated soft card 124 via a screen display (e.g., when user is ready to select the aggregated soft card to conduct an electronic transaction).

After being stored on mobile device 102, aggregated soft card 124 may be selected to conduct a wireless payment or non-payment (e.g., wireless data transfer) with a second wireless device, such wireless device reader 114 or a transit card reader. For example, an aggregated soft card may be selected by a user using mobile wallet application 118. Upon selection of the aggregated soft card, mobile device 102 accesses the associated AID linking list and activates the primary component soft card and the associated secondary component soft cards by transparently (i.e., invisible to the user) loading the corresponding AIDs into PPSE application 126 of mobile device 102. Notably, the AIDs associated with the component soft cards are populated in PPSE application 126 in the priority order defined by the AID linking list. For example, if there is a primary component soft card (e.g., Mastercard credit soft card) and two secondary component soft cards (e.g., BestBuy credit soft card and loyalty soft card), then three PPSE slots will be populated with three AIDs corresponding to the three component soft cards in PPSE application 126.

After loading the component soft card AIDs in PPSE application 126, mobile device 102 may then be interfaced (e.g., tapped) with wireless device reader 114. In one embodiment, NFC enabled wireless device reader 114 establish a wireless transaction communications link with mobile device 102, such as when wireless device reader 114 initiates a handshaking negotiation procedure when mobile device 102 is brought into close proximity to or tapped with wireless device reader 114. Communication between the two NFC enabled devices may be conducted, for example, when the antenna of mobile device 102 is brought within an electromagnetic field generated by wireless device reader 114. After the handshaking procedure is complete, a communications session/link between mobile device 102 and wireless device reader 114 is established.

Wireless device reader 114 may process the transaction differently based on whether it is configured with PAL support or not. If wireless device reader 114 is not configured with PAL support, then wireless device reader 114 may process the first (applicable) AID listed in PPSE application 126. If wireless device reader 114 includes PAL support, the wireless device reader at a participating merchant (or other business entity location), may compare the component soft card AIDs in PPSE application 126 with the AIDs listed in the reader's PAL 132. Notably, the list of AIDs in PAL 132 may be predefined based on a number of determination factors, such as the location of the merchant (i.e., the merchant store). Thus, if wireless device reader 114 is located in a BestBuy, PAL 132 may include the AID corresponding to a BestBuy credit soft card listed as the most preferred AID. In such a scenario, wireless device reader 114 may select the BestBuy component soft card (i.e., a secondary component soft card) instead of the Mastercard credit soft card (i.e., the primary component soft card) with or without the mobile device user's knowledge. Once wireless device reader 114 selects an AID, a signal or message is sent to mobile device 102 indicating the selection and the associated component soft card is utilized by mobile device 102 to conduct the wireless transaction with reader 114. In one embodiment, the selection of a given component soft card triggers an associated applet that includes its own protocol and application program that is recognized by wireless device reader 114 and is utilized to conduct the wireless transaction. For example, a BestBuy credit soft card includes a first applet containing a protocol and application data that can differ from a second applet containing a protocol and application data associated with a transit soft card.

In one embodiment, the selected component soft card(s) associated with the aggregated soft card may be transferred over an NFC communications link to reader 114 either via a peer to peer (P2P) mode in accordance with ISO 18092 or a card emulation mode in accordance to ISO 14443. Notably, if the peer to peer mode is utilized, a secure element in mobile device 102 (i.e., the sending wireless device) is not required.

Figure 2:
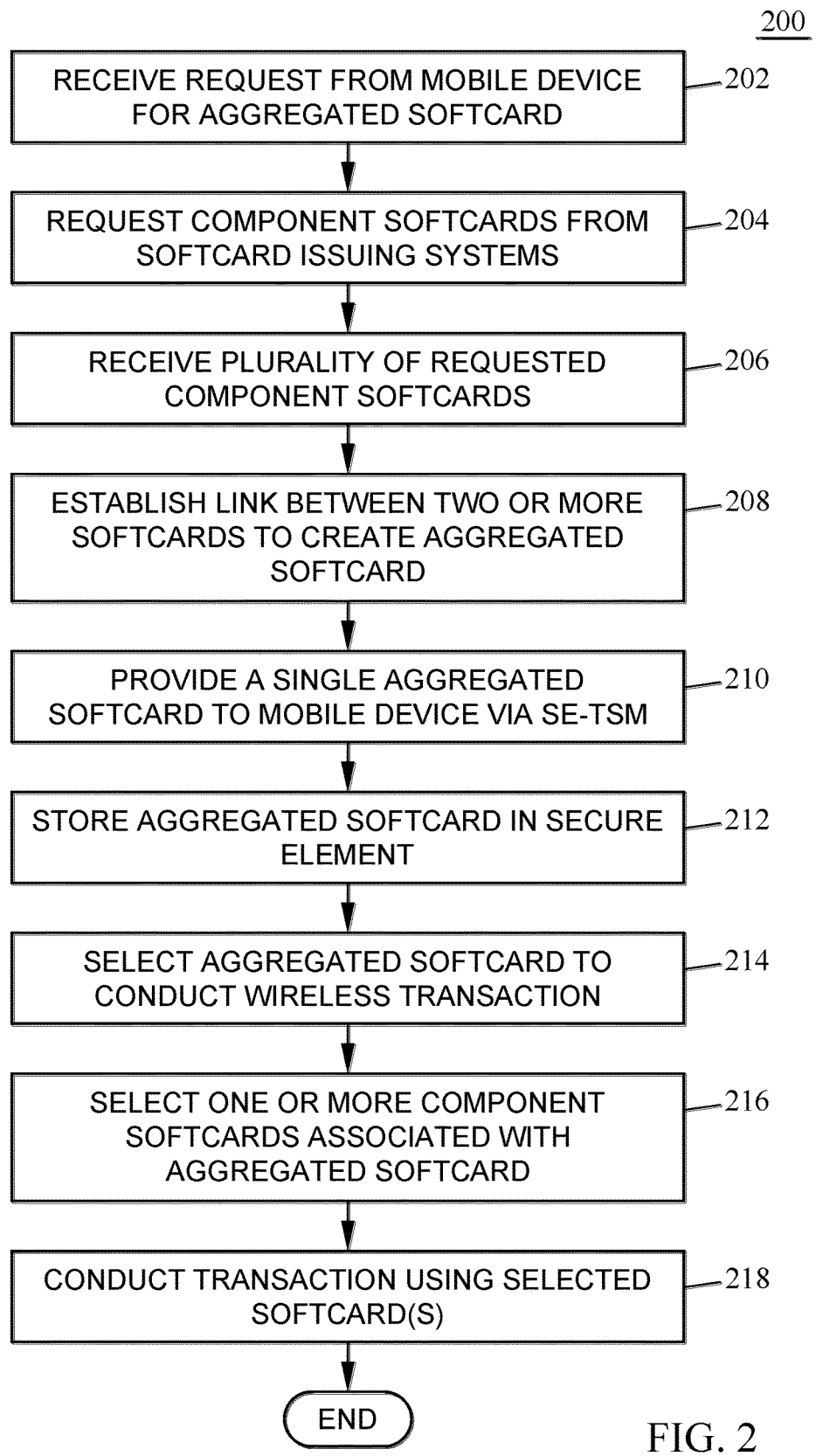
FIG. 2 is a flow chart illustrating an exemplary process for provisioning and utilizing an aggregated soft card on a mobile device according to an embodiment of the subject matter described herein.

FIG. 2 is a flow chart illustrating an exemplary method 200 for provisioning and utilizing an aggregated soft card on a mobile device according to an embodiment of the subject matter described herein. In block 202, a request for an aggregated soft card is received. In one embodiment, an issuer server, such as SP-TSM 106 receives a request message for an aggregated soft card from mobile device 102. As indicated above, the aggregated soft card request may include the SP-TSM address information, aggregated soft card identification information, and mobile subscriber identification information (associated with mobile device 102).

In block 204, requests for a plurality of component soft cards are sent to soft card issuing system servers. In one embodiment, SP-TSM 106 may use an aggregated soft card identifier to reference a mapping database 130 in order to determine the component soft cards that constitute (i.e., make up) the requested aggregated soft card. SP-TSM 106 may then use addresses obtained from database 130 to send a request to each of the soft card issuing system servers that hosts the component soft card data associated with the aggregated soft card. For example, if SP-TSM 106 receives an initial request for an aggregated soft card that includes a Mastercard branded soft card and a BestBuy merchant soft card, SP-TSM 106 may be configured to send a request to each of branded soft card issuing system 110 (e.g., a Mastercard soft card issuing system server) and merchant soft card issuing system 108 (e.g., a BestBuy soft card issuing system server).

In block 206, the requested component soft card data is received. In one embodiment, SP-TSM 106 receives the requested soft card data from the respective soft card issuing system servers that were contacted in block 204. For example, SP-TSM 106 may receive both the requested Mastercard soft card data and BestBuy soft card data from issuing system servers 110 and 108, respectively. As mentioned above, the component soft card data obtained from the issuing system servers may include credential, authentication, and account data corresponding to a subscriber user (e.g., associated with mobile device 102).

In block 208, a link between the component soft cards is established to create an aggregated soft card. In one embodiment, SP-TSM 106 generates/creates an aggregated soft card (or associated aggregated soft card data) by establishing a link between the two component soft cards (e.g., the Mastercard credit soft card and BestBuy credit soft card). For example, SP-TSM 106 may create a mapping/association table on behalf of a primary card issuer (e.g., Mastercard) that establishes an association between the primary component card and the secondary component card. In one embodiment, the mapping table may include an AIDs linking list that contains the primary and secondary component soft card AIDs associated with the aggregated soft card in a defined priority order. Although the example described in this figure only describes the linking of two soft cards, any number of soft cards may be linked without departing from the scope of the present subject matter.

In block 210, the aggregated soft card is provided to a mobile device. In one embodiment, SP-TSM 106 forwards the aggregated soft card data to SE-TSM 104. In one embodiment, the aggregated soft card data includes i) the primary and secondary component soft card data, ii) the AID linking list associated with the aggregated soft card, iii) an image of the aggregated soft card (e.g., image of primary component soft card) to be displayed when used by a mobile device. After receiving the aggregated soft card data, SE-TSM 104 may wirelessly provision the aggregated soft card data on mobile device 102. For example, SE-TSM 104 may be configured to establish a secure wireless communications link or channel with mobile device 102 that may be used to download the aggregated soft card data to mobile device 102. In an alternate embodiment, the aggregated soft card data may be communicated to mobile device 102 via an unsecure communications link/channel.

In block 212, the aggregated soft card data may be stored in the mobile device. In one embodiment, mobile device 102 may be configured to store the received aggregated soft card in a secure memory, such as secure element 122. In an alternate embodiment, SE-TSM 208 may communicate the aggregated soft card directly to secure element 122 (e.g., compel/force mobile device 102 to store the aggregated soft card in the secure element). In another embodiment, the aggregated soft card may be stored in baseband memory (not shown) of mobile device 102. Mobile device 102 may also be configured to store the AID linking list in memory 128.

In block 214, the aggregated soft card is selected to conduct a wireless transaction. In one embodiment, a user uses mobile wallet application 118 to select aggregated soft card 124 stored on mobile device 102 to conduct a transaction with reader 106. For example, the selected aggregated soft card may be designated for a contactless payment (or non-payment) transaction. Once the aggregated soft card is selected, mobile device 102 accesses the associated AID linking list stored in memory 128. The component soft card AIDS indicated in the AID linking list are then loaded into PPSE application 126 in accordance to the defined priority order. Notably, each component soft card AID is populated in its own PPSE slot. After PPSE application 126 is loaded with the aggregated soft card's component soft card AIDs, the transaction with wireless device reader 114 is conducted. In one embodiment, mobile device 102 taps or is placed in close proximity to wireless device reader 114. In response, wireless device reader 114 initiates a handshaking procedure in which a wireless communications link is established between mobile device 102 and wireless device reader 114.

In block 216, one or more component soft cards associated with the aggregated soft card is selected. Wireless device reader 114 may be configured to select an AID for one or more of the underlying component soft cards associated with the presented aggregated soft card based on one or more determination factors. In one embodiment, the determination factors may be established by PAL 132 provisioned on wireless device reader 114. As mentioned above, PAL 132 includes a priority list of AIDs that represents the programmed processing preferences of wireless device reader 114. For example, wireless device reader 114 can be programmed with an AID that corresponds to one or more of the component soft cards that are associated with the merchant location. For instance, if wireless device reader 114 may be programmed with an AID that identifies a BestBuy related AID. Wireless device reader 114 may then compare the AID listings in PAL 132 with the AIDs in PPSE application 126 to select a closed loop BestBuy component soft card associated with the presented aggregated soft card to process the transaction. If wireless device reader 114 is not located in a BestBuy store (but is instead located at a grocery store), then wireless device reader 114 may be configured to instead select the open loop Mastercard component soft card associated with the presented aggregated soft card.

In one embodiment, PAL 132 may be configured to list AIDS in a priority that drives reader 114 to select a soft card based on determination factors such a soft card selection made by a merchant at a point of sale associated with the wireless device reader, a selection made by a user of the wireless mobile device, a user preference stored in the mobile device, a real-time determination based on evaluation of an available offer or promotion, and a user preference stored on a back-end server.

In block 218, the transaction is conducted using the selected soft card. In one embodiment, wireless device reader 114 may be configured to proceed to utilize the component soft card selected in block 214 to conduct the pending wireless transaction. For example, wireless device reader 114 may send a signal message to mobile device 102 indicating the AID selection. In response, the appropriate soft card is utilized by mobile device 102 to conduct the wireless transaction with reader 114. Although method 200 describes the use of an aggregated soft card to conduct a payment transaction, non-payment transactions may be conducted in the same manner without departing from the scope of the present subject matter.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for provisioning and utilizing an aggregated soft card on a mobile device, the system comprising:

at least one processor;

a trusted service manager (TSM) server implemented by the at least one processor and configured to receive a request for an aggregated soft card from a mobile device, to access a mapping database to identify a primary component soft card and at least one secondary component soft card that constitutes the aggregated soft card using an aggregated soft card identifier contained in the request from the mobile device, to identify addresses of soft card issuing system servers hosting component soft card data associated with each of the primary component soft card and at least one secondary component soft card, to request the component soft card data associated with each of the primary component soft card and the at least one secondary component soft card from the soft card issuing system servers, to generate aggregated soft card data by establishing an application identifier linking list that links application identifiers associated with the component soft card data received from the soft card issuing system servers and specifies a predefined preference order by which the primary component soft card and that the at least one secondary component soft card are attempted for use in a wireless transaction between the mobile device and a wireless device reader, and to send the aggregated soft card data to the mobile device, wherein the application identifiers included in the application identifier linking list are loaded into a proximity payment system environment (PPSE) application of the mobile device in accordance with the predefined preference order in response to the aggregated soft card being selected to conduct the wireless transaction with the wireless device reader.

2. The system of claim 1 wherein the wireless device reader is configured to receive a request from the mobile device to conduct the wireless transaction using the aggregated soft card provisioned on the mobile device, to select at least one of the primary component soft card and the at least one secondary component soft card to conduct the wireless transaction based on one or more determination factors, and to conduct the wireless transaction over a communications link using the at least one component soft card that was selected.

3. The system of claim 2 wherein the one or more determination factors includes at least one of: a priority order listing maintained in a preferred application list maintained at the wireless device reader, a soft card selection made by a merchant at a point of sale associated with the wireless device reader, a selection made by a user of the wireless mobile device, a user preference stored in the mobile device, a real-time determination based on evaluation of an available offer or promotion, and a user preference stored on a back-end server.

4. The system of claim 1 wherein the TSM server is configured to generate the application identifier linking list that indicates a priority order of application identifiers associated with each of the primary component soft card and the at least one secondary component soft card.

5. The system of claim 4 wherein the TSM server is configured to send the application identifier linking list along with soft card data associated with each of the primary component soft card and at least one secondary component soft card.

6. The system of claim 1 wherein the mobile device receives the aggregated soft card data from the TSM server via a secure element-trusted service manager (SE-TSM) server, wherein the TSM server includes a service provider trusted service manager (SP-TSM) server.

7. The system of claim 1 wherein the aggregated soft card is visually displayed on the mobile device as a single soft card representation that includes at least one of: an icon, a symbol, a graphic, an image, and a displayed name.

8. A method for provisioning and utilizing an aggregated soft card on a mobile device, the method comprising:

receiving a request for an aggregated soft card from a mobile device;

accessing a mapping database to identify a primary component soft card and at least one secondary component soft card that constitute the aggregated soft card using an aggregated soft card identifier contained in the request from the mobile device;

identifying addresses of soft card issuing system servers hosting component soft card data associated with each of the primary component soft card and the at least one secondary component soft card;

requesting component soft card data associated with each of the primary component soft card and the at least one secondary component soft card from the soft card issuing system servers;

generating aggregated soft card data by establishing an application identifier linking list that links application identifiers associated with the component soft card data received from the soft card issuing system servers and specifies a predefined preference order in which the primary component soft card and the at least one secondary component soft card are attempted for use in a wireless transaction between the mobile device and a wireless device reader; and sending the aggregated soft card data to the mobile device, rein the application identifiers included in the application identifier linking list are loaded into a proximity payment system environment (PPSE) application of the mobile device in accordance with the predefined preference order in response to the aggregated soft card being selected to conduct the wireless transaction with the wireless device reader.

9. The method of claim 8 comprising:

receiving, at the wireless device reader, a request to conduct the wireless transaction using the aggregated soft card provisioned on the mobile device;

selecting at least one of the primary component soft card and the at least one secondary component soft card to conduct the wireless transaction based on one or more determination factors; and conducting the wireless transaction over a communications link using the at least one component soft card that was selected.

10. The method of claim 9 wherein the one or more determination factors includes at least one of: a priority order listing maintained in a preferred application list maintained at the wireless device reader, a soft card selection made by a merchant at a point of sale associated with the wireless device reader, a selection made by a user of the wireless mobile device, a user preference stored in the mobile device, a real-time determination based on evaluation of an available offer or promotion, and a user preference stored on a back-end server.

11. The method of claim 8 wherein establishing the link among the component soft card data includes generating the application identifier linking list that indicates a priority order of application identifiers associated with each of the primary component soft card and the at least one secondary component soft card.

12. The method of claim 11 wherein sending the aggregated soft card data includes sending the application identifier linking list along with soft card data associated with each of the primary component soft card and at least one secondary component soft card.

13. The method of claim 8 wherein the mobile device receives the aggregated soft card data from a service provider trusted service manager (SP-TSM) server via a secure element-trusted service manager (SE-TSM) server.

14. The method of claim 8 wherein the aggregated soft card is visually displayed on the mobile device as a single soft card representation that includes at least one of: an icon, a symbol, a graphic, an image, and a displayed name.

15. A non-transitory computer readable medium having stored thereon computer executable instructions that when executed by a processor of a computer controls the computer to perform steps comprising:
   receiving a request for an aggregated soft card from a mobile device;
   accessing a mapping database to identify a primary component soft card and at least one secondary component soft card that constitute the aggregated soft card using an aggregated soft card identifier contained in the request from the mobile device;
   identifying addresses of soft card issuing system servers hosting the component soft card data associated with each of the primary component soft card and the at least one secondary component soft card;
   requesting the component soft card data associated with each of the primary component soft card and the at least one secondary component soft card from the soft card issuing system servers;
   generating aggregated soft card data by establishing an application identifier linking list that links application identifiers associated with the component soft card data received from the soft card issuing system servers and specifies a predefined preference order in which the primary component soft card and the at least one secondary component soft card are attempted for use in a wireless transaction between the mobile device and a wireless device reader; and
   sending the aggregated soft card data to the mobile device, rein the application identifiers included in the application identifier linking list are loaded into a proximity payment system environment (PPSE) application of the mobile device in accordance with the predefined preference order in response to the aggregated soft card being selected to conduct the wireless transaction with the wireless device reader.

16. The non-transitory computer readable medium of claim 15 comprising:
   receiving, at the wireless device reader, a request to conduct the wireless transaction using the aggregated soft card provisioned on the mobile device;
   selecting at least one of the primary component soft card and the at least one secondary component soft card to conduct the wireless transaction based on one or more determination factors; and
   conducting the wireless transaction over a communications link using the at least one component soft card that was selected.

17. The non-transitory computer readable medium of claim 16 wherein the one or more determination factors includes at least one of: a priority order listing maintained in a preferred application list maintained at the wireless device reader, a soft card selection made by a merchant at a point of sale associated with the wireless device reader, a selection made by a user of the wireless mobile device, a user preference stored in the mobile device, a real-time determination based on evaluation of an available offer or promotion, and a user preference stored on a back-end server.

18. The non-transitory computer readable medium of claim 15 wherein establishing the link among the component soft card data includes generating the application identifier linking list that indicates a priority order of application identifiers associated with each of the primary component soft card and the at least one secondary component soft card.

19. The non-transitory computer readable medium of claim 18 wherein sending the aggregated soft card data includes sending the application identifier linking list along with soft card data associated with each of the primary component soft card and at least one secondary component soft card.

20. The non-transitory computer readable medium of claim 15 wherein the mobile device receives the aggregated soft card data from a service provider trusted service manager (SP-TSM) server via a secure element-trusted service manager (SE-TSM) server.

* * * * *